(12) United States Patent
Iwabuchi

(10) Patent No.: US 6,694,666 B2
(45) Date of Patent: Feb. 24, 2004

(54) DETACHABLE GRIP FOR A FISHING ROD AND FISHING ROD WITH SAME

(75) Inventor: Masakazu Iwabuchi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/105,225

(22) Filed: Mar. 26, 2002

(65) Prior Publication Data

US 2002/0100208 A1 Aug. 1, 2002

Related U.S. Application Data

(62) Division of application No. 09/372,603, filed on Aug. 12, 1999.

(30) Foreign Application Priority Data

Aug. 17, 1998 (JP) ............................................ 10-230829

(51) Int. Cl.$^7$ ............................................. A01K 87/00
(52) U.S. Cl. ....................................................... 43/25
(58) Field of Search ............................. 43/18.1, 23, 25, 43/25.2; 16/422; 294/58; 473/301, 302, 303; D22/108, 150

(56) References Cited

U.S. PATENT DOCUMENTS 2,621,357 A * 12/1952 Stuman ........................ 16/422
2,650,448 A * 9/1953 Lichtig ........................... 43/25
4,537,400 A * 8/1985 Adam ........................... 273/75
5,862,622 A * 1/1999 Sandman ....................... 43/25
5,867,868 A * 2/1999 Ward ......................... 16/114 R

* cited by examiner

Primary Examiner—Kurt Rowan
(74) Attorney, Agent, or Firm—Shinjyu Global IP Counselors, LLP

(57) ABSTRACT

A removable grip for a fishing rod may be attached and removed from the fishing rod. The removable grip includes a cylindrical main body that is formed by a pair of semi-cylindrical half shells that when joined together define the cylindrical main body of the grip. The two half shells are each formed with an elongated recess that together define a central bore of the main body for receiving a portion of the fishing rod. The central bore is lined with an anti-skid material that engages the fishing rod such that the grip and the rod are not likely to move with respect to one another. The half shells are secured to one another by any of a variety of securing means, such as Velcro™ strap members, elastic cap members that are fixed to opposite ends of the main body, wedge members that fit into recesses formed in each half shell, or a strap that wraps around the outer circumference of the main body.

5 Claims, 7 Drawing Sheets

DETACHABLE GRIP FOR A FISHING ROD AND FISHING ROD WITH SAME

This is a divisional application of U.S. patent application Ser. No. 09/372,603, filed on Aug. 12, 1999, which under 35 U.S.C. § 120 claims the priority of Japanese Patent Application 10-230829, filed on Aug. 17, 1998. The entire disclosure of the application Ser. No. 09/372,603 is hereby incorporated by reference.

BACKGROUND OF THE INVENTION

A. Field of the Invention

The present invention relates to a detachable grip installable on a fishing rod for providing a place to hold the fishing rod, and to a fishing rod having such a detachable grip.

B. Description of the Background Art

A conventional fishing rod typically includes a rod, a butt grip fixed to a butt end of the rod, a reel seat located on the rod adjacent to a tip end of the butt grip, the reel seat for mounting a fishing reel, and a front grip fixed to the rod at a tip end of the real seat. With such a conventional fishing rod, a user casts or otherwise manipulates the fishing rod while holding on to the butt grip and the front grip.

There are conventional fishing rods that are manufactured without front grips. A conventional fishing rod that does not include a front grip is typically used by fishermen to catch light weight fish. A user casts or otherwise manipulates the fishing rod, holding only the butt grip.

After long periods of usage, the grip of a fishing rod eventually starts to show noticeable signs of damage and wear. In addition, if held by a hand that has also made contact fish or bait, the grip of the rod retains a fishy aroma and develops bad smells. The problem is that it is not possible to easily replace the grip since the grip is not typically removable from the rod. Rather, once the grip shows wear or starts to smell bad, it is necessary to replace the entire fishing rod.

Further, a problem associated with a fishing rod which only has a butt grip is that some fisherman use the area where a front grip ought to be for grasping the rod. If the rod is very narrow, or has a smooth finish, manipulation of the rod is difficult and a solid retention of the rod may not be possible thereby limiting precision in manipulation of the rod.

SUMMARY OF THE INVENTION

An object of the present invention is to provide a replaceable grip for a fishing rod, and a fishing rod which includes such a grip.

In accordance with one aspect of the present invention, a detachable grip for attachment to an elongated rod such as a fishing rod includes a grip main body having a cylindrical shape. The main body includes a pair of half shells that are adapted for attachment to one another. Each of the half shells has a semi-cylindrical shape and is formed with a recess that extends along an axially extending surface thereof such that with the half shells are attached to one another, the recesses defining a central bore within the main body for receiving and retaining a portion of the elongated rod.

Preferably, the half shells are attached to one another by a fixing means.

Preferably, the fixing means include at least one strap member fixed to one end of one of the half shells, the strap member having hook and loop fastening members formed on opposite sides thereof.

Alternatively, the fixing means includes two strap members fixed to opposite ends of both of the half shells. The strap members define a hinge about which the half shells may open and close. A portion of the strap members is formed with hook and loop fastening members.

Alternatively, the main body is formed with protruding portions at opposite ends thereof. The fixing means includes end caps that are adapted to wrap around the protruding portions thereby securing the main body to the elongated rod.

Alternatively, the main body is formed with a spiral groove that extends around an outer surface of the main body, and the fixing means includes a cord fixed at a first end thereof to one of the half shells, the cord being extendable around the main body within the spiral groove. One of the half shells is formed with an engagement portion for receiving a distal end of the cord for securing the cord to the main body.

Alternatively, each of the half shells are formed with corresponding recesses that define wedge holes on an outer surface of the main body and the fixing means includes a plurality of wedges adapted for insertion into the wedge holes for securing the half shells together thereby securing the main body to the elongated rod.

Preferably, each of the recesses formed on the half shells is lined with an anti-skid material.

Preferably, each of the half shells is formed with complimentary protrusions and recesses that engage one another.

When the grip of the rod is damaged or becomes worn during use over an extended period of time or when a user wishes remove or re-position the grip to a different position on the fishing rod, the user may remove the grip from the rod easily using any of the various fixing means. Hence, it is not necessary to replace the entire fishing rod to deal with wear or damage on the grip. Rather, it is possible to replace the grip or move the grip to an optional position on the rod.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

Figure 1:
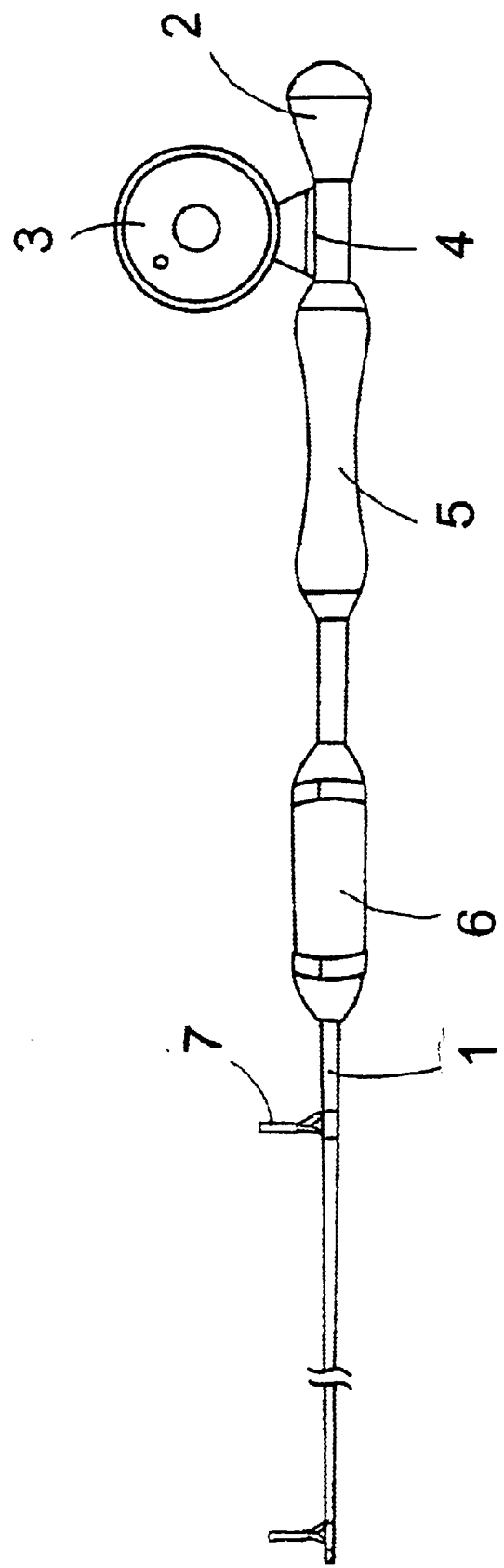
FIG. 1 is a fragmentary side elevation of a fishing rod and a detachable grip in accordance with a first embodiment of the present invention.

A first embodiment of the present invention is described below with respect to FIGS. 1, 2, 3 and 4.

A fishing rod according to a first embodiment of the present invention includes a rod member 1, a butt grip 2 that is fixed to a butt end of the rod member 1, a reel seat 4 formed on the rod at a tip side of the butt grip 2 for detachably receiving a reel 3, an intermediate grip 5 that is fixed to a tip side to the reel seat 4, and a front grip 6 that is detachably disposed on the rod 1 at an optional position near a tip side of the intermediate grip 5. Further, a plurality of guide rings 7 are fixed to the rod member 1 at spaced apart locations between a tip side of the front grip 6 and a distal tip end of the rod 1. A fishing line (not shown) extending from the reel 3 is guided to the tip end of the rod 1 through the guide rings 7.

Figure 2:
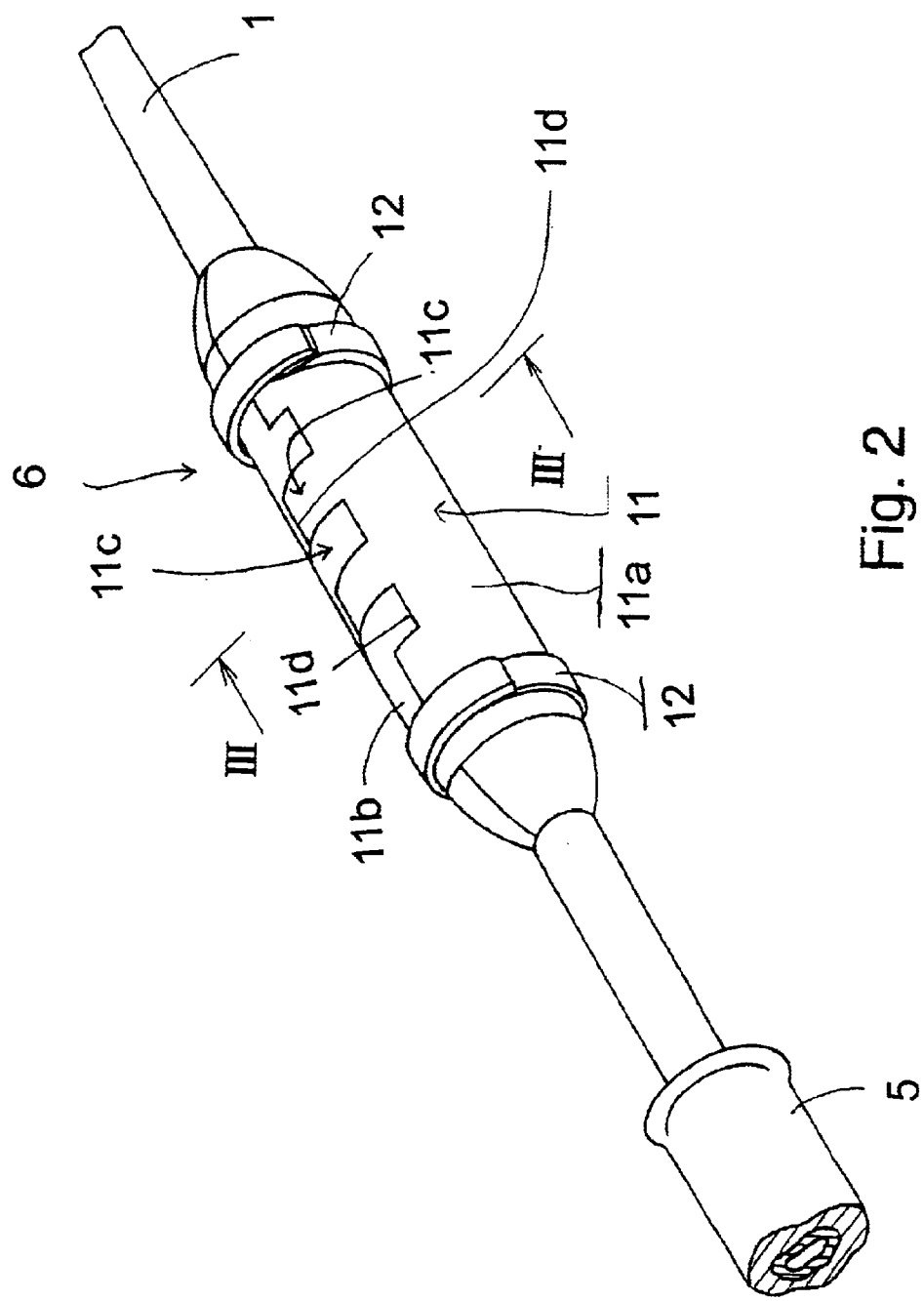
FIG. 2 is a fragmentary perspective view, on a slightly enlarged scale, showing details of the detachable grip depicted in FIG. 1.
Figure 3:
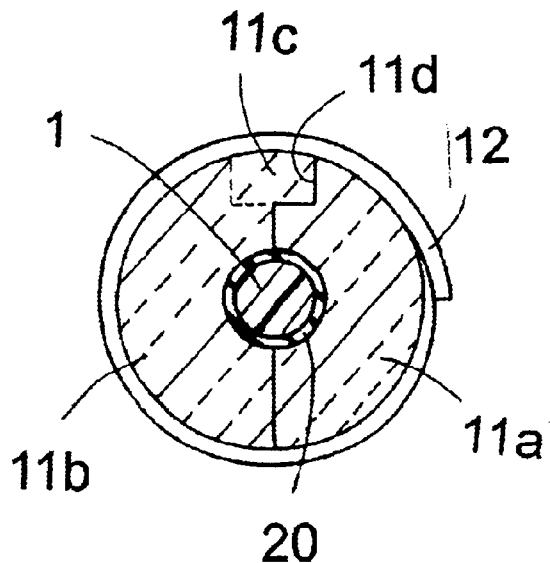
FIG. 3 is a cross-sectional view of the detachable grip and fishing rod taken along III—III in FIG. 2.
Figure 4:
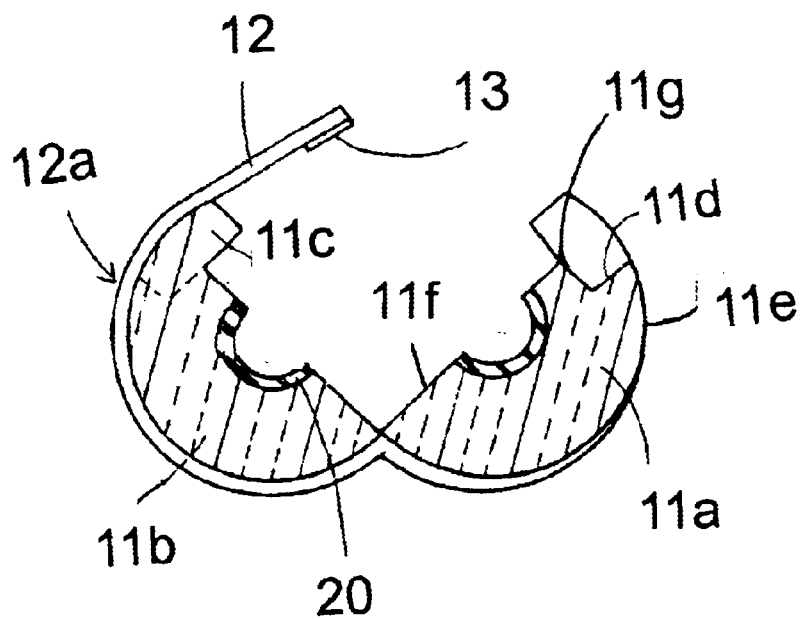
FIG. 4 is a cross-sectional view, similar to FIG. 3, showing the detachable grip detached from the fishing rod.

As shown in FIGS. 2, 3 and 4, the front grip 6 includes a cylindrical main body 11 and two band members 12 that extend around each end the main body 11, one band member 12 being located on a tip end of the main body 11 and one band member 12 being located on a butt end of the main body 11.

The main body 11 is cylindrically shaped and includes two half shells 11a and 11b, each half shell being formed approximately in the shape of cylinder cut in half or semi-cylindrical shape, with a cylindrical surface lie and a planar surface 11f. The main body 11 is formed of a synthetic resin foam such as polyurethane foam. The half shells 11a and 11b, as shown in FIG. 4, can be easily separated from one another by removing the band members 12, as is described in greater detail below.

Further, along one edge of each of the half shells 11a and 11b, a plurality of protrusions 11c are formed. The protrusions 11c are formed in an alternating manner with respect to the half shells 11a and 11b such that the protrusions 11c interlock with each other like fingers of two hands clasping each other, as shown in FIG. 2. Further, adjacent to each protrusion 11c, a recess 11d, which forms an inner surface 11g on the cylindrical surface 11e, is formed to receive a corresponding protrusion 11c. For instance, in the embodiment depicted in FIG. 2, the half shell 11b has three protrusions 11c which extend into three recesses 11d formed in the half shell 11a. Similarly, the half shell 11a has two protrusions 11c which extend into two corresponding recesses 11d formed in the half shell 11b. It should be understood that the number of protrusions 11c and the number of recesses 11d is not limited to the number depicted in FIG. 2. There may be any number of such protrusions 11c and recesses 11d formed in the two half shells 11a and 11b.

Each of the half shells 11a and 11b is formed with semi-cylindrical recesses that extend along the length of each of the half shells 11a and 11b such that when the half shells 11a and 11b are joined together, as shown in FIG. 3, the semi-cylindrical recesses define a central bore extending the length of the main body 11, the central bore having approximately the same diameter as the outer diameter of the rod member 1. As shown in FIGS. 3 and 4, an anti-skid lining 20 of synthetic rubber such as natural rubber and isoprene rubber is disposed on an inner peripheral surface of each semi-cylindrical recess. The anti-skid linings 20 are bonded and fixed to the recesses by an adhesive or similar bonding material.

The pair of band members 12 extend circumferentially around the main body 11 and are spaced apart from one another such that one band member 12 is located at one axial end of the main body 11 and the other band member 12 is located at the opposite axial end of the main body 11. In other words, one band member 12 is located at the tip end of the main body 11 and the other band member 12 is located at the butt end of the band member 12.

The band members 12 are made of rubber material that can freely elastically stretch and shrink. An outer peripheral surface of each of the band members 12 is formed with a textile or other similar material that serves as fastener surfaces 12a which provide a fastening surface for Hook-and-Loop fasteners 13, as is described further below. As shown in FIGS. 3 and 4, the inner surface of each band members 12 is adhered to an outer peripheral surface of the half shell 11a and to an outer peripheral surface of the half shell 11b so that the two half shells 11a and 11b are fixed to each other with a portion of the band members 12 serving as a hinge about which the half shells 11a and 11b open. The one end of each of the band members 12 extends from the half shell 11b toward the outer peripheral surface of the half member 11a. Hook-and-Loop fasteners 13 are fixed to inner peripheral surfaces of the band members 12 such that with the half shells 11a and 11b closed, as shown in FIG. 3, the hook-and-loop fasteners 13 contact an opposite end of the outer peripheral surface of the band member 12 thereby fastening the half shells 11a and 11b together.

The front grip 6 is attachable to and detachable from the rod member 1 in the following manner.

To fix the front grip 6 to the rod member 1, the rod member 1 is held in an open position (as in FIG. 4) so that the half shells 11a and 11b of the main body 11 may be positioned around the rod member 1 in the central recess of the main body 11. The half shells 11a and 11b are then moved to a closed position as shown in FIG. 3 as the half shells 11a and 11b pivot about the hinge defined by the band members 12. As the half shells 11a and 11b move to the closed positions, the protrusions 11c are meshed together extending into corresponding recesses 11d thereby tentatively fixing the half shells 11a and 11b together. Thereafter, the pair of band members 12 are wound tightly around the main body 11 and the Hook-and-Loop fasteners 13 are adhered to the fastener surfaces 12a on the outer peripheral surfaces of the band members 12. As a result, the main body 11 is fixed to the rod member 1. The above described procedure is reversed in order to detach the front grip 6 from the rod member 1.

The anti-skid lining 20 prevents movement of the front grip 6 along the length of the rod member 1.

It should be understood that the front grip 6 described above may be used at about any location along the length of a rod, and need not be limited to a front or tip side location. The front grip 6 may be positioned just about anywhere along the length of the rod member 1.

With a fishing rod having such a detachable grip, if the grip 6 is damaged during use over a long period of time, if it is necessary to replace the grip 6, or if it is necessary to move the grip 6 for any reason, the grip 6 can be detached and re-installed easily and simply without damage to the rod. Hence, it is not necessary to replace the entire fishing rod when a front grip has been damaged or shown signs of wear. Further, with the grip 6, it is possible to move the grip 6 to an alternate position on the rod. Movement of the grip 6 may improve the response of the fishing rod as it is manipulated. Further, with the grip 6 attached to the rod member 1, the anti-skid members 20 suppress movement of the front grip 6 in the axial direction and the circumferential direction with respect to the rod.

Second Embodiment

A second embodiment of the present invention is described below with reference to FIGS. 5 and 6.

Figure 5:
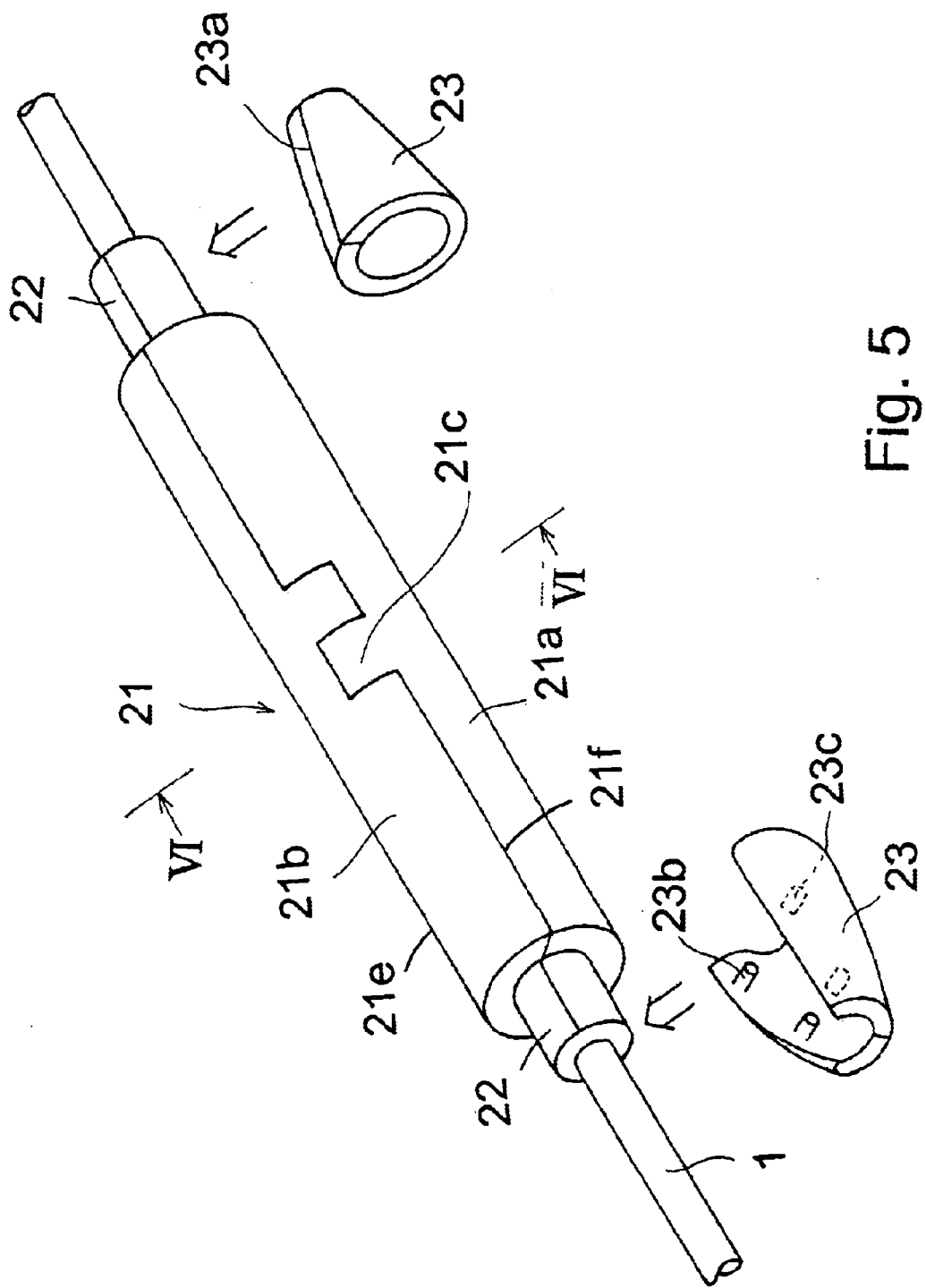
FIG. 5 is a fragmentary perspective view of a detachable grip in accordance with a second embodiment of the present invention.
Figure 6:
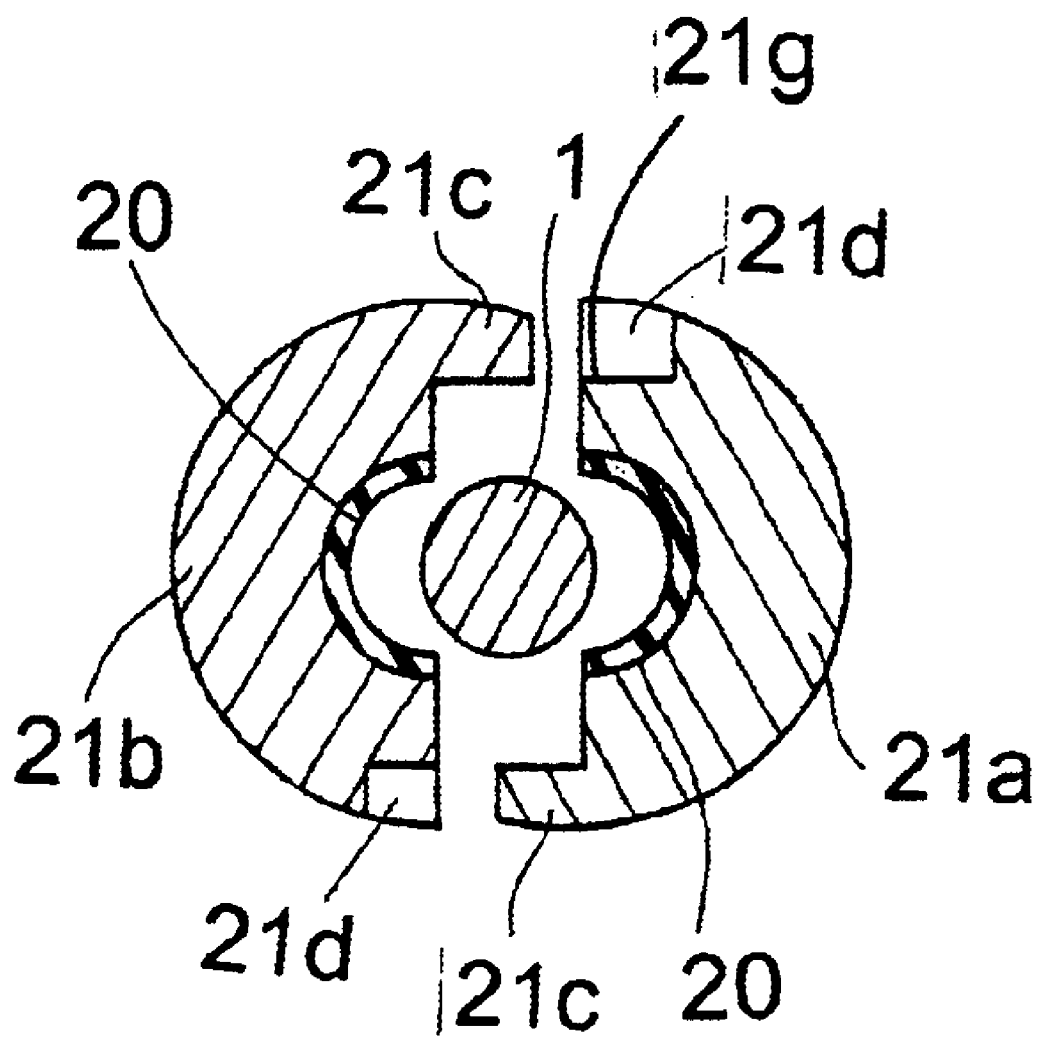
FIG. 6 is a cross-sectional view of the detachable grip and rod taken along VI—VI in FIG. 5, with the grip partially detached.

A front grip according to the second embodiment of the present invention, as shown in FIGS. 5 and 6, includes a cylindrical main body 21, a pair of protruding portions 22, and a pair of caps 23 detachably attachable to the protruding portions 22. One of the protruding portions 22 is located at a tip end of the main body 21 and the other protruding portion 22 is located at a butt end of the main body 21, each protruding portion 22 having diameter that is smaller than the diameter of the main body 21.

The main body 21 is cylindrically shaped and is formed by a pair of half shells 21a and 21b, each half shell being shaped approximately as a semi-cylinder or half cylinder having a cylindrical surface 21e and a planar surface 21f and being cut along an axial length. Each half shell 21a and 21b of the main body 21 is formed of a synthetic resin foam such as polyurethane foam. Protrusions 21c are formed on the half shells 21a and 21b. Each protrusion 21c extends in a circumferential direction from one half shell toward the other half shell. Each half shell 21a and 21b is formed with a recess 21d that has an inner surface 21g formed on the cylindrical surface 21e, and is shaped to receive one protrusion 21c. Specifically, the protrusion 21c formed on the half shell 21a fits into a corresponding recess 21d formed on the half shell 21b. Similarly, the protrusion 21c formed on the half shell 21b fits into a corresponding recess 21d formed on the half shell 21a.

Although only one protrusion 21c is shown on an upper side (relative to FIG. 5) of the half shell 21a in FIG. 5, it should be understood that several protrusions 21c and corresponding recesses 21d may be formed on the half shells 21a and 21b. The second embodiment of the present invention is not limited to the number of protrusions 21c and recesses 21d depicted in FIGS. 5 and 6.

As is clear in FIGS. 5 and 6, the protrusions 21c and recesses 21d are such that the half shells 21a and 21b interlock with each other like the fingers on two clasped hands.

Each half shell 21a and 21b is further formed with semi-cylindrical recesses that extend the axial length of each half shell such that, with the half shells 21a and 21b joined together as shown in FIG. 5, the semi-cylindrical recesses define a central bore in the main body 21 shaped to receive the rod member 1. As well, the central bore of the main body 21 has an inner diameter that is approximately the same as the outer diameter of the rod member 1.

The semi-cylindrical recesses of the half shells 21a and 21b are lined with an anti-skid lining 20 of rubber such as natural rubber, isoprene rubber, or synthetic rubber. The anti-skid members 20 are bonded and fixed to the recesses by an adhesive or other similar bonding agents.

The protruding portions 22 are formed contiguously with the half shells 21a, 21b of the main body 21. The anti-skid members 20 which are disposed in the dents of the main body 21 are formed contiguous with the protruding portions 22.

The cap portions 23 are configured to fit over the protruding portions 22 and are formed with a cylindrical shape having a tapering contour in an axial direction, as is shown in FIG. 5. Each cap portion 23 is formed with a single slit 23a that extends in the axial direction. The cap portion 23 is made of a flexible material so that the cap portion 23 can open at the slit 23a while being elastically deformed the circumferential direction. A plurality of projections 23b and matching holes 23c that receive the projections 23b are formed on surfaces of the slit 23a. The inner diameter of each cap portion 23 is sized to match the outer diameter of the corresponding protruding portion 22 such that with the cap portion 23 wrapped around the protruding portion 22, and with the projections 23b snugly fit into corresponding holes 23c, the cap portions 23 secure the main body 21 of the grip to the rod 1. Specifically, when the projections 23b are forced into the holes 23c, engagement between the projections 23b and the holes 23c securely holds the cap portions 23 in position. The cap portions 23 extend circumferentially around the protruding portions 22 maintaining the main body 21 in firm engagement with the rod 1. The main body 21 is further fixed in position with respect to the rod 1 due to contact between the anti-skid lining 20 on the inner surface of the main body 1 and the outer surface of the rod 1.

The front grip is attached to and detached from the rod member 1 in the following manner.

To fix the front grip to the rod member 1, the pair of half shells 21a and 21b of the main body 21 are held apart from one another as the rod member 1 is positioned in the recess lined with anti-skid lining 20 of either one of the half shells 21a and 21b. The other of the half shells 21a and 21b is then brought into contact with the rod as the protrusions 21c and recesses 21d engage and interlock with one another thereby ensuring proper alignment between the half shells 21a and 21b. Thereafter, the two cap portions 23 are wrapped around respective protruding portions 22. The projections 23b are then forced into the holes 23c, thereby retaining the cap portions 23 about the outer circumference of the protruding portions 22. The above procedure may be reversed in order to remove the cap portions 23 from the half shells 21a and 21b allowing easy removal of the front grip.

The fishing rod having a front grip as described above has generally the same effects as set forth above with respect to the first embodiment.

Third Embodiment

Figure 7:
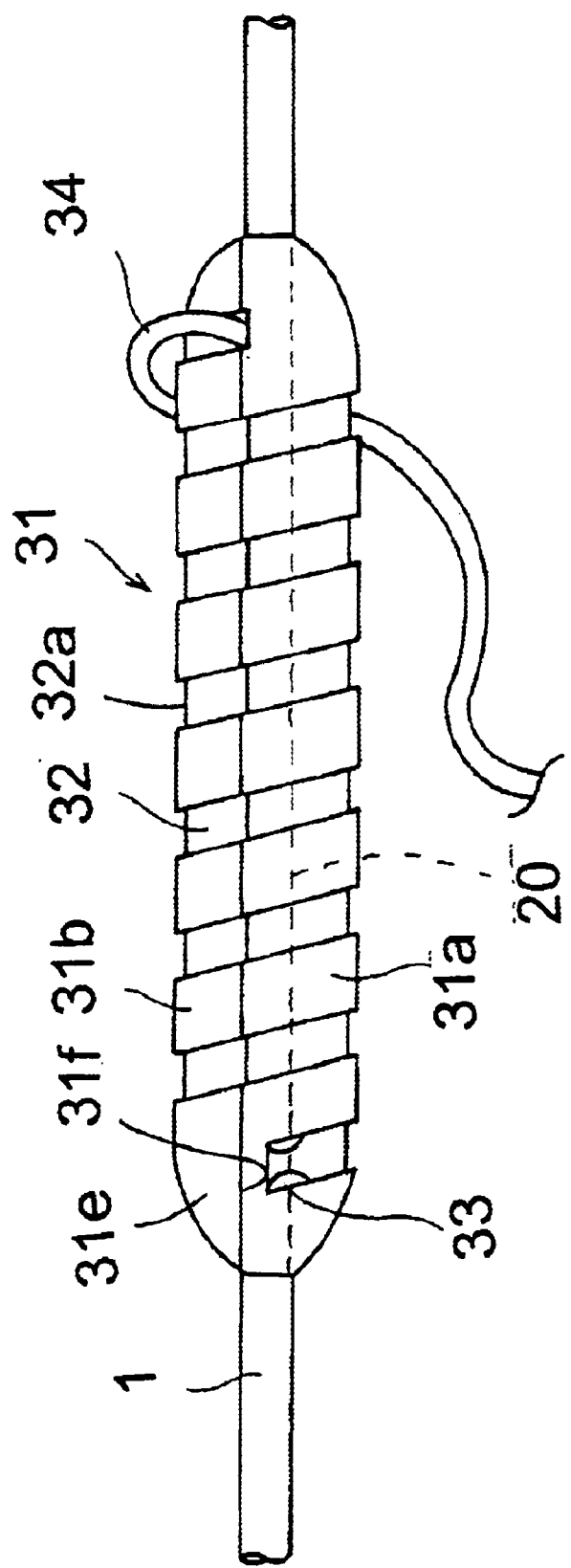
FIG. 7 is a fragmentary side view of a detachable grip in accordance with a third embodiment of the present invention.

A third embodiment of the present invention is described below with reference to FIG. 7. A front grip according to the third embodiment of the present invention includes a cylindrical main body 31. The main body 31 has a cylindrical shape formed by a pair of half shells 31a and 31b. Each of the half shells 31a and 31b is a half cylinder having a semi-cylindrical shape, with a cylindrical surface 31e and a planar surface 31f. Semi-cylindrical shaped recesses (not shown) are formed on the opposing surfaces of the half shells 31a and 31b such that when the planar surfaces 31f of the half shells 31a and 31b are put together, a central bore is defined in the main body 31 into which the rod member 1 may be position. In addition, an anti-skid material 20 of synthetic rubber such as natural rubber and isoprene rubber is disposed on an inner peripheral surfaces of each recess of the half shells 31a and 31b. The anti-skid material 20 is bonded and fixed to the surfaces of the recesses by an adhesive or the like. It should be appreciated that the anti-skid material 20 and recesses in the half shells 31a and 31b are generally the same as the anti-skid material 20 and recesses depicted in FIGS. 3, 4 and 6, and described with respect to the first and second embodiments.

The half shells 31a and 31b are formed with a series of spiral grooves such that when the half shells 31a and 31b are put together to form the main body 31, the main body 31 has a continuous single spiral groove 32, which forms an inner surface 32a on the cylindrical surface 31e and loops repeatedly around the main body 31 in a circumferential direction, but spirals in an axial direction from one end of the main body 31 to the opposite end of the main body 31.

An engagement portion 33 is formed in the half shell 31a at one end of the spiral groove 32 at one end of the half shell 31a. A cord 34 is fixed to the opposite end of the half shell 31a at a location coinciding with the opposite end of the spiral groove 32. The cord 34 may be in a variety of shapes and forms. However, in a preferred embodiment of the present invention, the cord 34 preferably has a flat tape-like shape such that the cord 34 may be wrapped around the main body 31 within the confines of the spiral groove 32. The cord 34 is formed by a synthetic fiber such as nylon. The cord 34 preferably contains an elastic fiber and has some flexibility or elasticity. Alternatively, the cord 34 may be made of a leather material or leather like material in the shape of a narrow belt.

Preferably, the depth of the spiral groove 32 and the thickness of the cord 34 are the same such that once the cord 34 is wrapped around the main body 31 within the spiral groove 32, the outer surface of the main body 31 is fairly smooth having a near constant outer diameter.

The engagement portion 33 includes protrusions that extend from opposite sides of the one end of the spiral groove such that the end of the spiral groove 32 has a width that is narrower than the width along the length of the spiral groove 32. The distal end of the cord 34 may be inserted into the engagement portion 33 thereby retaining the cord 34 in the spiral groove 32.

In order to attach the front grip to the rod member 1, the pair of half shells 31a and 31b are placed on opposite sides of the rod member 1 such that the rod member 1 extends through the central bore (not shown) of the main body 31. Since the central bore is lined with the anti-skid material 20, there is little likelihood of movement between the main body 31 and rod 1. With the half shells 31a and 31b in place on opposite sides of the rod 1, the cord 34 is wound around the main body 31 with the cord 34 lying within the spiral groove 32. The distal end of the cord 34 is then pinched and secured by the engagement portion 33. The above described procedure may be reversed in order to detach the front grip. Specifically the distal end of the cord 34 may be pulled out of the engagement portion 33, releasing the cord 34 and thereafter the two half shells 31a and 31b may be removed from the rod 1.

The fishing rod having the above described grip having the main body 31 has generally the same effects as described above with respect to the first embodiment.

Fourth Embodiment

Figure 8:
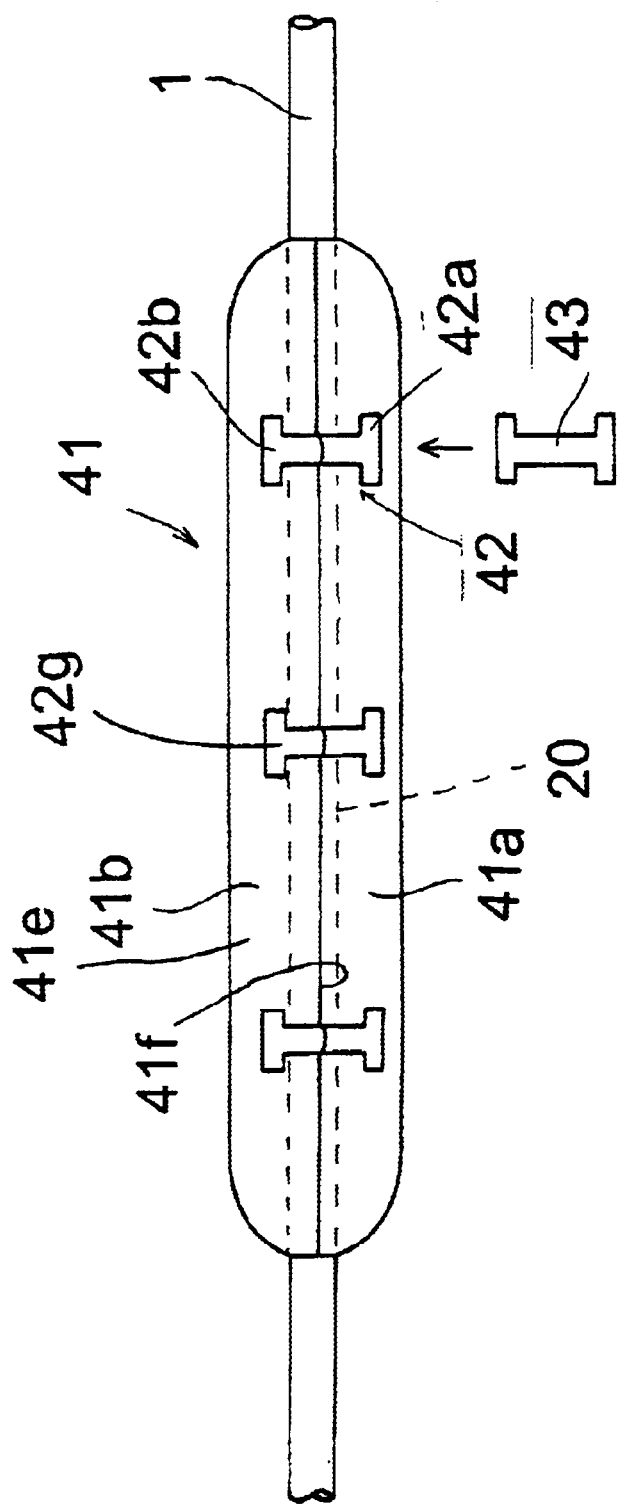
FIG. 8 is a fragmentary side view of a detachable grip in accordance with a fourth embodiment of the present invention.

A fourth embodiment of the present invention is described below with respect to FIG. 8. A front grip according to the fourth embodiment of the present invention includes a cylindrical main body 41, a plurality of wedge holes 42 which are formed in an outer peripheral surface of the main body 41, and wedges 43 which fit the wedge holes 42.

The main body 41 is a cylindrical member which is made up of a pair of half shells 41a and 41b that are shaped as half cylinders each having a semi-cylindrical shape with a cylindrical surface 41e and a planar surface 41f. Each half shell 41a and 41b is formed with an elongated recess (not shown) that extends lengthwise along opposing surfaces thereof such that, with the half shells 41a and 41b held together, a central bore is defined within the main body 41 for receiving the rod 1. Further, as in the first, second and third embodiments described above, the surfaces of the recesses which define the central bore of the main body 41 are lined with an anti-skid material 20 of synthetic rubber such as natural rubber and isoprene rubber. The anti-skid material 20 is bonded and fixed to the surfaces of the recesses by an adhesive or the like.

Each of the wedge holes 42 is defined by a pair of T-shaped recesses 42a and 42b, each having an inner surface 42g formed on the cylindrical surface 41e of in the half shells 41a and 41b, respectively. In other words, the half shell 41a is formed with a plurality of T-shaped recesses 42a that are aligned with T-shaped recesses 42b formed in the half shell 41b. The recesses 42a and 42b together define the wedge holes 42. It should be appreciated that the wedge holes 42 may be formed on both sides of the main body 41 (only one side of the main body 41 is shown in FIG. 8). Further, it should be understood that although only three wedge holes 42 are formed on the side of the main body 41 depicted in FIG. 8, fewer or more that three wedge holes 42 may be utilized.

The wedges 43 are I-shaped members that are dimensioned that match the wedge holes 42 such that the wedges 43 may be inserted into and later removed from respective wedge holes 42. It should be understood that the wedges 43 are provided with dimensions such that at least a small level of force is required to insert the wedges 43 into the wedge holes 42. As a result, one inserted into the wedge holes 42, the wedges 43 are not easily removed without a similar level of force.

To attach the front grip to the rod member 1, the half shells 41a and 41b are placed on opposite sides of the rod member 1 and held together to form the main body 41. The anti-skid material 20 on the inner surfaces of the half shells 41a and 41b prevent movement between the rod 1 and the main body 41. Thereafter, the wedges 43 are forced into the wedge holes 42, thereby fixing the half shells 41a and 41b together. Using the tip of a screw driver or other similar implement, the wedges 43 may be easily removed from the wedge holes 42 in order to permit removal the half shells 41a and 41b of the main body 41 from the rod 1.

The fishing rod and grip having the above described structure has effects that are generally the same as those described above with respect to the first embodiment.

Alternative Embodiments (a) Although only the front grip is attachable to and detachable from the rod member 1 in the embodiments described above, the present invention is not limited to the front grip. In other words, the grips described above may be installed on a rod to define the intermediate grip 5 and/or the butt grip 2 as shown in FIG. 1.

(b) The protrusions 11c and recesses 11d in the first embodiment, and protrusions 21c and recesses 21d in the second embodiment may optionally be omitted.

(c) The band member 12 in the first embodiment need not be elongated straps made of Hook-and-Loop fastener material such as Velcro™, but may alternatively be fastening material disposed directly to contacting surfaces of the half shells 11a and 11b. For instance, the surface of the half shell 11a that contacts the half shell 11b may be lined with hook material and the surface of the half shell 11b that contacts the half shell 11a may be lined with loop material.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A detachable grip for attachment to an elongated rod such as a fishing rod, comprising:

a grip main body having a pair of half shells, each of said half shells being adapted for attachment to one another, each of said half shells having a semi-cylindrical shape with a cylindrical surface and a planar surface so as to form a cylindrical shape when said planar surfaces of said half shells are attached to one another, each of said half shells having a plurality of protrusions and adjacent recesses, each of said half shells formed with a semi-circular recess on its planar surface extending along an axially extending surface thereof such that with said planar surfaces of said half shells attached to each other, said recesses define a central bore within said main body for receiving and retaining a portion of the elongated rod, each of said half shells further having a concavity that has an inner surface formed on its cylindrical surface, such that said protrusions and recesses extend only partially through each of said half shells and a lower edge of said protrusions is adjacent said inner surface when said planar surfaces are attached to each other; and fixing means for holding said half shells together when said planar surfaces of said half shells are attached to one another.

2. The detachable grip as set forth in claim 1, wherein said concavity wedge holes on said cylindrical surfaces of said main body, and said fixing means includes a plurality of wedges adapted for insertion into said wedge holes for securing said half shells together thereby securing said main body to the elongated rod.

3. The detachable grip as set forth in claim 1, wherein each of said recesses formed on said half shells is lined with an anti-skid material.

4. A fishing rod having at least one detachable grip, said fishing rod and grip, comprising:

an elongated rod having a reel attachment portion for receiving a fishing reel;

a detachable grip attached to a portion of said elongated rod, said detachable grip including:

a grip main body having a pair of half shells, each of said half shells being adapted for attachment to one another, each of said half shells having a semi-cylindrical shape with a cylindrical surface and a planar surface so as to form a cylindrical shape when said planar surfaces of said half shells are attached to one another, each of said half shells having a plurality of protrusions and adjacent recesses, each of said half shells formed with a semi-circular recess on its planar surface extending along an axially extending surface thereof such that with said planar surfaces of said half shells attached to each other, said recesses define a central bore within said main body for receiving and retaining a portion of the elongated rod, each of said half shells further having a concavity that has an inner surface formed on its cylindrical surface, such that said protrusions and recesses extend only partially through each of said half shells and a lower edge of said protrusions is adjacent said inner surface when said planar surfaces are attached to each other; and fixing means for holding said half shells together when said planar surfaces of said half shells are attached to one another.

5. The fishing rod as set forth in claim 4, wherein each of said recesses formed on said half shells is lined with an anti-skid material.

* * * * *